United States Patent [19]
Benedite et al.

[11] 4,417,124
[45] Nov. 22, 1983

[54] PROCESS AND INSTALLATION FOR MACHINING BY RADIATION A COMPOSITE PART

[75] Inventors: Claude Benedite, Panazol; Marcel Lafaye, Nexon; Jean-Pierre Lenfant, Rochechouart; Jacques Reynier, Bosmie L'Aiguille, all of France

[73] Assignee: Claude Benedite Laser Techniques Saint-Cyr, St-Laurent-sur-Gorre, France

[21] Appl. No.: 317,406

[22] Filed: Nov. 2, 1981

[30] Foreign Application Priority Data

Nov. 7, 1980 [FR] France ................................ 80 23847

[51] Int. Cl.³ .............................................. B23K 27/00
[52] U.S. Cl. ......................... 219/121 LH; 219/121 LJ
[58] Field of Search ................... 219/121 LH, 121 LJ, 219/121 LY, 121 LG, 121 LN; 29/557

[56] References Cited

U.S. PATENT DOCUMENTS 3,663,795  5/1972  Myer ............................ 219/121 LQ
4,258,246  3/1981  Karube et al. ............... 219/121 LW
4,329,564  5/1982  Hazelton .................. 219/121 LN X

FOREIGN PATENT DOCUMENTS 2733082  2/1979  Fed. Rep. of Germany ........ 29/597

*Primary Examiner*—C. L. Albritton
*Attorney, Agent, or Firm*—Cushman, Darby & Cushman

[57] ABSTRACT

The invention relates to a process for treating, by an electromagnetic radiation, a composite part comprising a first material which is relatively more absorbent of said radiation and a second material which is relatively less absorbent thereof, both materials appearing in zones on the surface, whereby at least the first material is treated up to a given depth in the course of a relative displacement of the piece and of the radiation with respect to each other. The invention also relates to an installation for carrying out the process.

5 Claims, 7 Drawing Figures

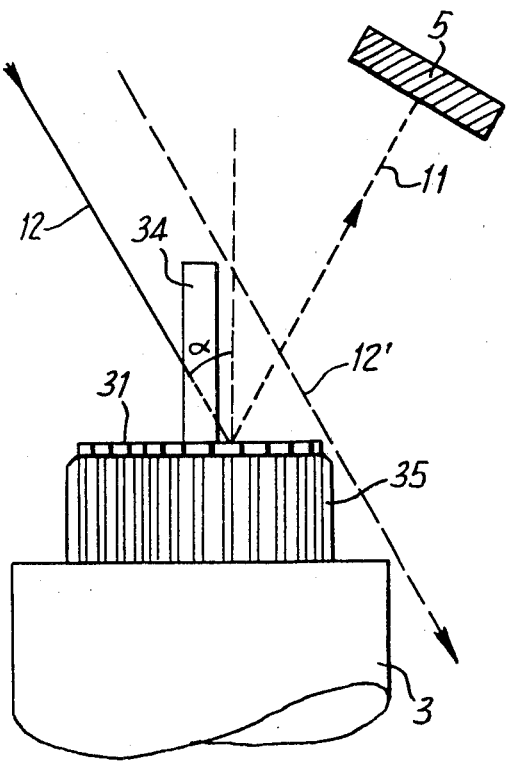
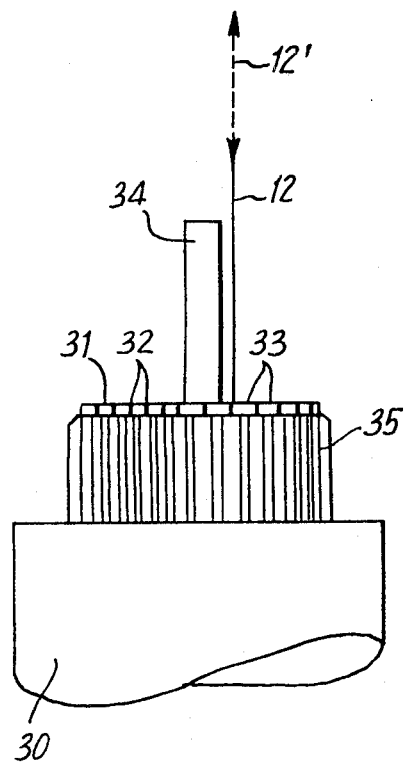
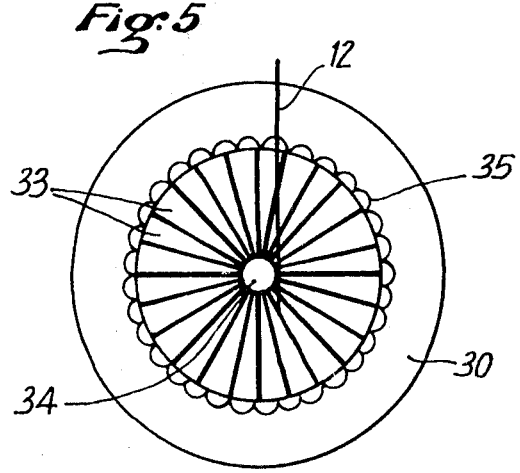

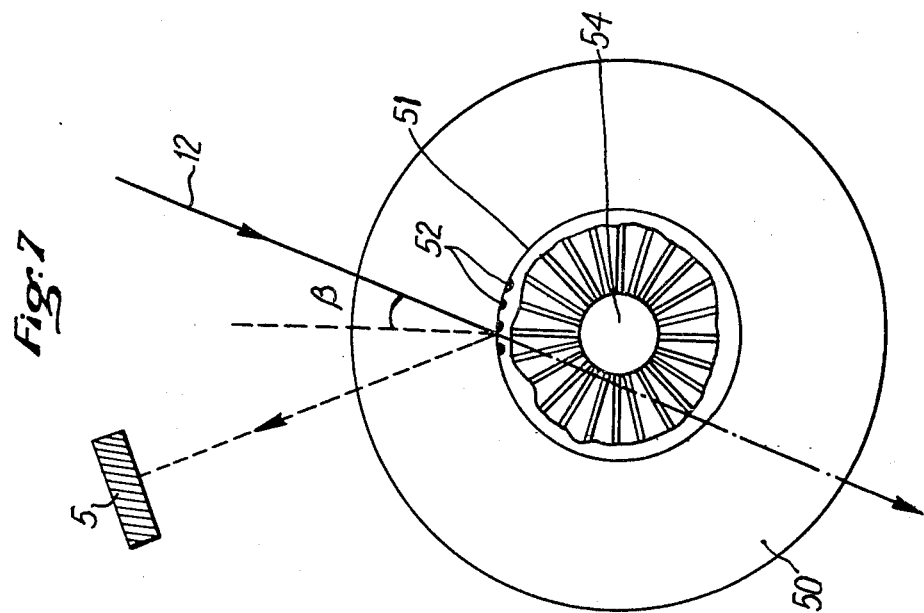
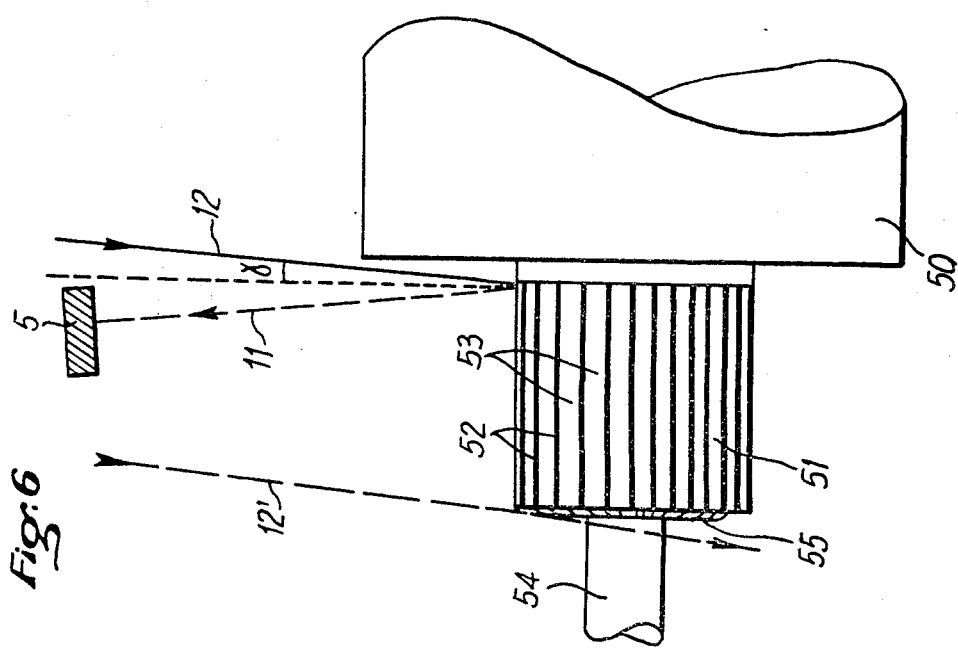

PROCESS AND INSTALLATION FOR MACHINING BY RADIATION A COMPOSITE PART

BACKGROUND OF THE PRESENT INVENTION

Processes are known, in which a part, for example the commutator of an electric motor, is machined by means of a directional beam of radiation, such as a laser beam. Such a process has been described in German Patent Application 2 733 082.

Such a process presents a considerable drawback in that the radiation impinges on the surface to be machined at a perpendicular angle, this causing it to be reflected by the reflecting faces in a direction parallel to the incident ray. The reflected radiation, conveying energy substantially equal to that used for machining the absorbent faces in turn impinges on the radiation emitting system and destroys it. Furthermore, irregularities on the edge of the surfaces to be machined risk damaging the peripheral masses which are affected by the radiation if it is in a direction perpendicular to the plane of machining. More precisely, for example, machining by radiation normal with respect to the surface of a commutator of an electric motor risks, in the known process, reaching the windings or other sensitive members when the radiation beam extends beyond a part of the surface to be machined due to inevitable, even minute imperfections.

It is an object of the present invention to overcome the above-mentioned drawbacks, i.e. to avoid damage to the system emitting the radiation beam and any damage to the part to be machined. It is a further object to protect the personnel from the reflected radiations, whilst they are still in control on the paths of the reflected radiation. It is another object to propose an installation for carrying out the process which has numerous advantages from the standpoint of safety and a high production rate.

SUMMARY OF THE PRESENT INVENTION

These objects are attained by a process of the type described hereinabove, due to the fact that the radiation is directed obliquely with respect to the surface to be treated. In this way, the self-destruction of the emitter system is avoided and the personnel is protected whilst maintaining control of the direction of the reflected radiation.

In the process applied to a part having masses to be protected located beyond an edge limiting a surface of the piece to be treated according to the invention, in the relative displacement of the part and of the radiation with respect to each other, the oblique radiation is permanently directed on the surface to be treated in a direction whereby the masses to be protected are maintained in the shadow of the edge.

If the composite part to be treated by a directional electromagnetic radiation, such as a laser radiation, is a part of revolution, such as a commutator of an electric motor which is machined in continuous or indexed rotation to remove the most absorbent matter to a given depth, the invention provides directing the oblique radiation in a path not passing through the axis of rotation. By these means, the peripheral masses, for example the windings on the one hand, are protected from any undesired action of the radiation and, on the other hand, if necessary, the central part adjacent the axis.

According to a preferred embodiment, a body absorbing or dispersing the radiation is interposed on the path of the radiation possibly reflected by the surface of the less absorbent material. All the reflected radiation is thus safely stopped.

The objects of the invention are also attained by using an installation which comprises a generator of directional electromagnetic radiation, a means for fixing a part to be treated on the surface by the radiation emitted by the generator, and means for relative displacement of the part to be treated and of the radiation, and in which means are provided to ensure that, in all circumstances, the direction of the radiation is oblique with respect to the surface of the part to be treated.

In an installation comprising a rotating support on which a part of revolution, such as a commutator of an electric motor, may be fixed, rotating about its axis in continuous or indexed rotation, and a generator of directional radiation beam, such as a laser generator, directed towards a surface of the part of revolution, said installation comprises, according to the invention, means for directing the radiation beam in position imposing thereon an oblique path with respect to the surface of the piece of revolution to be treated.

It is preferred if the means for directing the radiation beam, imposing thereon an oblique path with respect to the surface of the part of revolution to be treated rotating about its axis, are means for directing this radiation beam along a path not passing through the axis of rotation.

The invention provides an installation for simultaneously treating at least two parts, which comprises at least two rotating supports for as many parts and means for direction on said parts as many radiation beams associated respectively with each of the supports. Said beams may come directely from as many laser sources or may be obtained, as is known per se, by division of a main beam with the aid of semi-transparent mirror or by generation of two beams of the same mode and the same power from the two ends of the same optical generator.

For treating a flat surface of revolution or a conical surface, in which the rotating support of the piece to be treated and the radiation beam move with respect to each other to produce a spiral or helical path on the surface to be treated, the preferred installation comprises means for controlling the speed of rotation and/or of mutual displacement of the support and the beam.

In an preferred installation in which the beam is fixed and the rotating support may move in translation parallel to its own axis, there are means for controlling the speed of rotation of the rotating support and/or of the translation of the support by the instantaneous radial distance of the point of impact of the beam. In this way, an instantaneous linear speed of treatment is obtained which is perfectly adapted to the purpose to be attained, i.e. a uniform speed tangential to the path of machining or treatment.

According to a preferred embodiment, the installation comprises a transfer unit for at least one part to be treated, said transfer unit with indexed drum being able to grip a part, position it, rotate it and displace it in translation beneath the radiation beam, then unload it at a pick-up station. The transfer unit comprises at least three holding members corresponding respectively to three stations, a treatment station, a gripping station and an unloading station, respectively but is comprises a single translation means simultaneously and conjointly ensuring translation in said first holding member of the part to the treatment station beneath the radiation beam, the displacement of the second holding member towards the gripping station and the displacement of said third holding member moving back from the unloading station. A maximum working rate may be obtained by these means, as gripping and unloading are effected simultaneously and conjointly during the machining phase. To terminate the cycle, there remains only a rotation and rapid simultaneous translation of the drum thus returned into initial position for the following sequence.

BRIEF DESCRIPTION OF THE DRAWINGS

The invention will be more readily understood on reading the following description with reference to the accompanying drawings, in which:

FIG. 3 along II—II of FIG. 1, FIG. 4 at right angles to the preceding view and also passing through the axis of the rotor, FIG. 5 in plan view, FIGS. 6 and 7 are side and axial views of a rotor with cylindrical commutator being machined by the process according to the invention.

DESCRIPTION OF THE PREFERRED EMBODIMENTS

Figure 1:
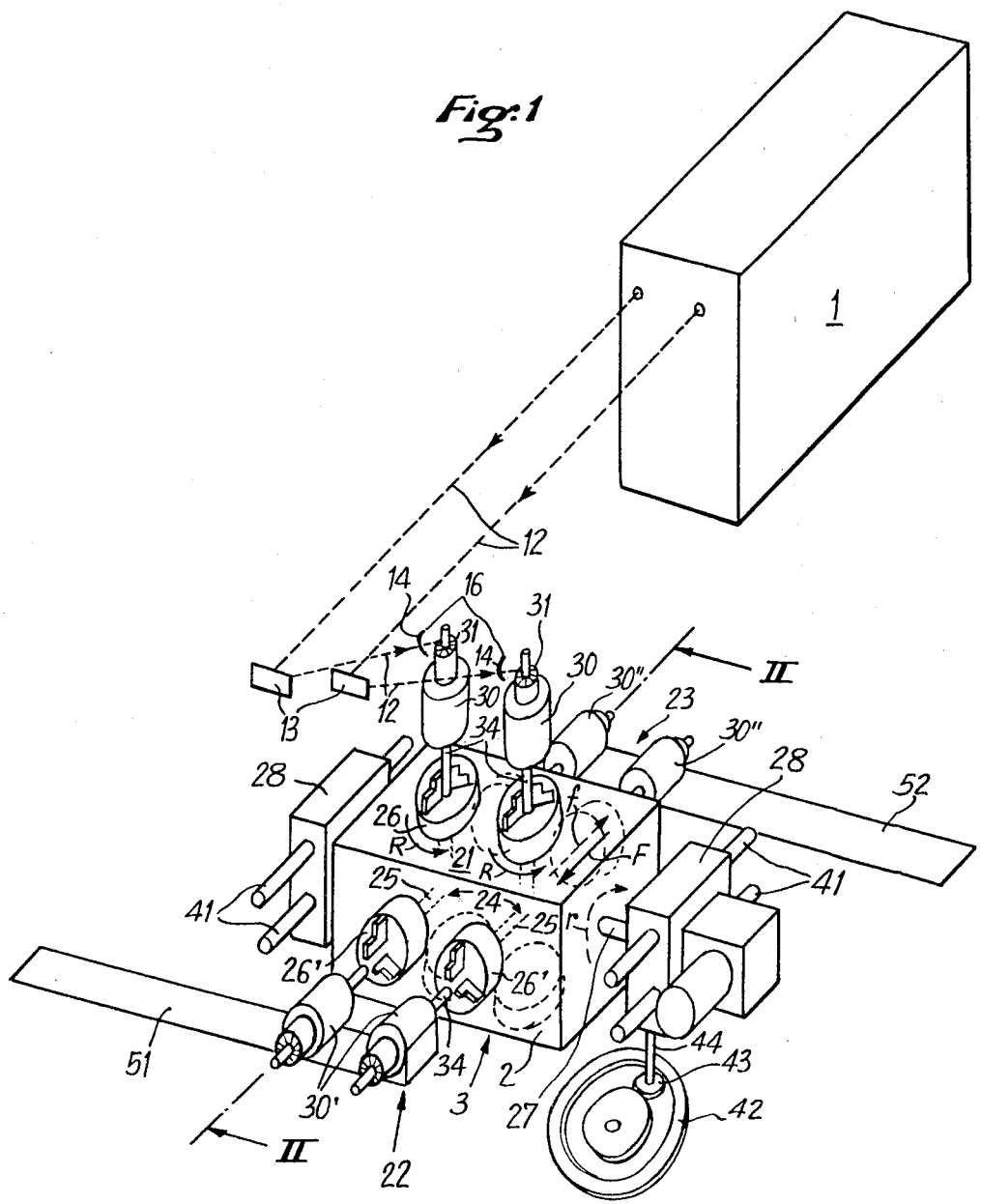
FIG. 1 is a schematic perspective view of an installation according to the invention for carrying out the process according to the invention.
Figure 2:
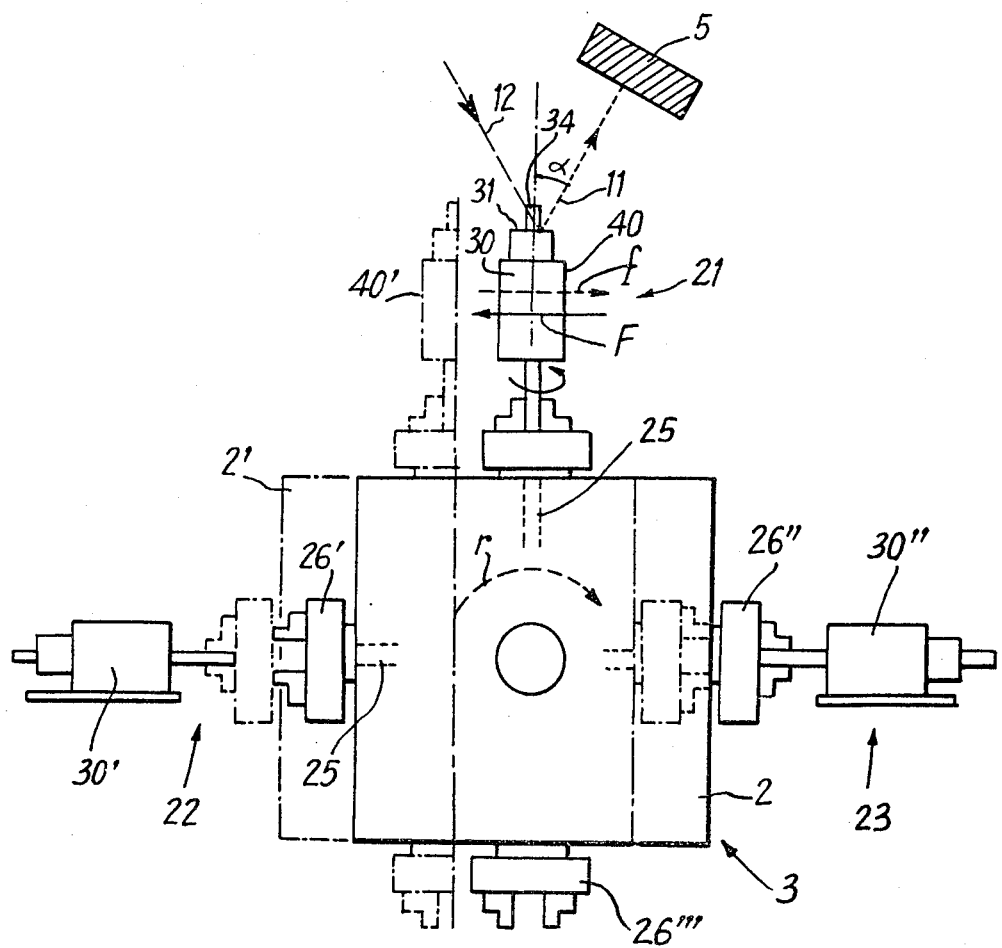
FIG. 2 is a side view in section along II—II of FIG. 1 of the transfer unit of the installation of FIG. 1, FIGS. 3, 4 and 5 are three views respectively of a flat commutator of a rotor being machined on the installation of FIG. 1.

Referring now to the drawings, FIG. 1 shows an installation according to the invention which comprises a laser generator 1 in fixed position, for example, but in nonlimiting manner, a $CO_2$ laser generator emitting two beams 12 directed by two optical reflectors 13 toward a double treatment or machining station 21 by means of a respective focusing device 14. The treatment station 21 is one of the three stations 21 to 23 in front of which a transfer unit 3 with drum 2, with four indexed positions at 90° with respect to one another, may present, simultaneously and respectively, three of four assembles 24 each comprising two pins 25 perpendicular to the axis of rotation 27 of the drum 2. Each pin 25 bears a chuck 26 to fix the pin or shaft 34 of a rotor 30. In FIGS. 1 to 5, the rotors 30 to be machined comprise flat commutators 31 from which it is desired to remove to a certain depth the insulator 32 from between the segments 33, with the aid of a beam 12 associated therewith. According to the invention, the radiation 12 is directed by the optical reflector 13, possibly adjustable in inclination, and by the focusing device 14, on the flat surface of the commutator 31 associated therewith at an angle α of at least about 15° to the most about 45° with respect to the axis of the rotor 30, i.e. at the same angle α with respect to a perpendicular to the flat surface of the commutator.

The drum 2 is mounted on its indexing pivot pin 27, which is mounted at its two ends on a carriage 28, one of the carriages bearing at the same time the indexer 29. The carriages 28 are mounted on guide rails 41 perpendicular to the indexing axis 27, i.e. parallel to the surface plane of the commutators 31 to be machined. To machine said commutators, the two pins 25 of the machining station holding the two rotors at the machining station are rotated in the direction of arrows R, the carriages 28 are displaced on their rails 41 in the direction of arrow F from a starting position 40 of the rotor in which the plane of the beam 12 parallel to the axis does not pass through the axis or shaft of rotation 34 of the rotor 30 up to a position 40' in which the beam 12, having remained fixed, takes the relative position 12' of FIG. 3 by the displacement of the rotor in translation in the direction of arrow F, without the beam 12 ever encountering the axis or shaft 34. It is also important according to the invention that the reflected radiation 11 does not pass through the axis or shaft 34 of the rotor either. The translation in direction F up to 2' of the drum 2 with the two rotors 30 machined at station 21 is effected by a rotating cam 42 driving a roller 43 driving a rod 44 fast with one of the two carriages 28 of the drum, the profile of said cam being such that, in the course of displacement in translation in the direction of arrow F, the speed of this displacement thus controlled is variable from a relatively fast speed near the axis or shaft 34 of the rotor 30, up to a relatively slower speed on the periphery, so that, for example, the tangential scanning speed of the commutator 31 by the beam 12 is constant to obtain a constant depth of removal of the insulat or 32. This mechanical means employing a cam may be replaced by any other equivalent known means, such as control by digital or analog electronic, hydraulic or pneumatic control. It will be noted, more particularly from FIG. 3, that, at the end of machining, the beam 12, then being in the relative position 12', does not reach the windings 35 or other conductors or elements of the rotor which, due to the inclination of the beam at angle α, remain beneath the shadow projected from the commutator 31 in all circumstances.

The other functions of the transfer unit 3 will now be described in greater detail, this transfer unit making it possible in one operational cycle to machine the commutators of two rotors, to grip two other with a view to machining thereof in the following cycle and to unload at a pick-up station the two which were machined in the preceding cycle. The transfer unit 3 is placed between two conveyors, for example two step by step conveyors 51 and 52, of the so-called "pilgrim step" type. The conveyor 51 supplies the gripping station 22 by simultaneously presenting, in the appropriate direction, the shafts 34 of two rotors 30', each respectively in alignment with one of the two chucks 26' perpendicular to the chucks 26 at that moment at the machining station 21. The conveyor 52 serves the pick-up station 23 where the two chucks 26', diametrically opposite those 26' which are at the gripping station 22, are located at that moment. At a given instant, at the beginning of machining at station 21, two rotors 30" are held respectively in the chucks 26 positioned, tightened in front of the pick-up station 23 and two rotors 30' are waiting at the gripping station 22 opposite two chucks 26, loosened, in position opposite the preceding ones. The commutators of the two rotors 30 at that moment at the treatment station 2 are then machined, by rotating them by means of the pins 25 on which they are mounted, whilst displacing the drum 2 in translation in the direction of arrow F, as has been stated above. As soon as the translation along F beings, a control means loosens the jaws of the two chucks 26" positioned in front of the pick-up station 23, so that the rotors 30" previously held by these chucks are deposited at the pick-up station 23, whilst, at the end of translation F, a control means tightens the chucks 26' positioned with their jaws open in front of the gripping station 22, after the shafts 34 of the rotors 30' waiting at this station have penetrated in the open chucks during the translation of the drum 2 in the direction of arrow F. When machining is terminated, the driving shafts of the rotors now machined are stopped, the rotors 30" deposited at the pick-up station have meanwhile been evacuated by the conveyor 52, whilst the rotors 30' waiting at the gripping station 22, or new rotors to be machined, are in position in two chucks. At that moment, the chucks positioned at the gripping station 22 are tightened, the transfer unit 3 is moved back quickly in the direction of arrow f, this driving the two new rotors, whilst the drum is rotated through a quarter turn about its axis 27, in the direction of arrow r which brings the whole to the starting position identical, to within 90°, to the preceding one for a new cycle for machining the two new rotors, now 30, for gripping and taking up rotors two by two. Of course, the cycle of the operations will advatageously be automatic and effected, for example, by a digital or equivalent control.

In the preceding examples, it has been provided to interpose on the path 11 of the radiation possibly reflected by the non-absorbent part of the surface to be treated, an absorbent body 5, for example made of carbon, to protect the personnel and the equipment from this reflected radiation.

FIGS. 6 and 7 show a rotor 50 with cylindrical commutator 51 about a shaft 54 from which it is desired to remove, to a certain depth, the insulator 52 from between the segments 53 with the aid of a beam 12. According to the invention, the beam 12 which is directed in spaced apart relationship with respect to the axis or shaft of the rotor, further presents, in projection perpendicular to the shaft 54, an angle $\beta$ with respect to a perpendicular to the surface of the commutator 51 and, in projection in axial plane, an angle $\gamma$ with respect to the same perpendicular the angle of the beam with respect to this perpendicular being at least about 15° to at the most about 45°. The inclination $\beta$ is chosen in order not to reach other parts of the rotor 50 and particularly the windings 55 which remain in the shadow of the commutator during the whole time of machining during which the rotor is displaced along its axis 54, whilst rotating about its axis, so that the beam scans it helically. At the end of machining, the end beam 12' does not reach the windings 55.

Various modifications of detail may be made without departing from the scope of the invention, for example by controlling by the instantaneous radial position of the beam 12, not the speed of translation F, but the speed of rotation R of the piece of revolution treated. The application of the invention to other problems than removal of the insulator from between the segments of commutators will not depart from the scope thereof.

We claim:

1. Process for treating, by electromagnetic radiation, a plane surface of a composite piece comprising a first material relatively more absorbent of this radiation and a second material relatively less absorbent of this radiation, these two materials appearing by zones at the surface, this composite piece being part of a mass located beyond an edge limiting the plane surface to be treated, according to which the radiation is given an inclination $\alpha$ in relation to a perpendicular to this surface, the values of this inclination $\alpha$ being determined so that the mass is protected by always remaining in the shadow limited by said edge of the treated surface and so that any beam reflected by the latter surface will be directed in a predetermined direction.

2. Process for treating, by electromagnetic radiation, a cylindrical surface of a composite piece comprising a first material relatively more absorbent of this radiation and a second material relatively less absorbent of this radiation, these two materials appearing by zones as the surface, this composite piece being part of a mass located beyond an edge limiting the cylindrical surface to be treated, according to which the radiation is given a first inclination $\beta$ in a first plane in relation to a perpendicular to this surface to obtain both a suitable treatment of the surface to be treated and a defined direction of the possible reflected beam, and a second inclination $\gamma$ in a second plane in relation to a perpendicular to this surface, the value of this second inclination $\gamma$ being determined so that the mass is protected by remaining always in the shadow limited by said edge of the treated surface and so that any reflected beam will be directed in a predetermined direction.

3. Process according to any one of claims 1 or 2 according to which a radiation absorbing body is placed in the path of any reflected beam.

4. Installation for using the process as in claim 1, comprising a generator of directed electromagnetic radiation, means for fastening a piece having a plane surface to be treated by the radiation emitted by the generator, means for relative movement of said piece and said radiation, said piece comprising a mass to be protected located beyond an edge limiting the plane surface to be treated, means giving said radiation an inclination $\alpha$ in relation to a perpendicular to the surface to be treated, this inclination given to the radiation putting the mass to be protected in the shadow limited by the edge of the treated surface and imposing a determined direction on any reflected beam.

5. Installation for using the process as in claim 2 comprising a generator of directed electromagnetic radiation, means for fastening a piece having a curved surface to be treated by the radiation emitted by said generator, means of relative displacement of said piece and said radiation, said piece comprising a mass to be protected located beyond an edge limiting the curved surface to be treated, means giving said radiation a first inclination $\beta$ in a first plane and a second inclination $\gamma$ in a second plane, each of these inclinations putting the mass to be protected in the shadow limited by the edge of the treated surface and the two inclinations each imposing a determined direction on any reflected beam.

* * * * *